Apr. 10, 1923. 1,451,124
W. O. STOLZE
AUTOMATIC DEVICE FOR FISHING THROUGH ICE
Filed Oct. 3, 1922
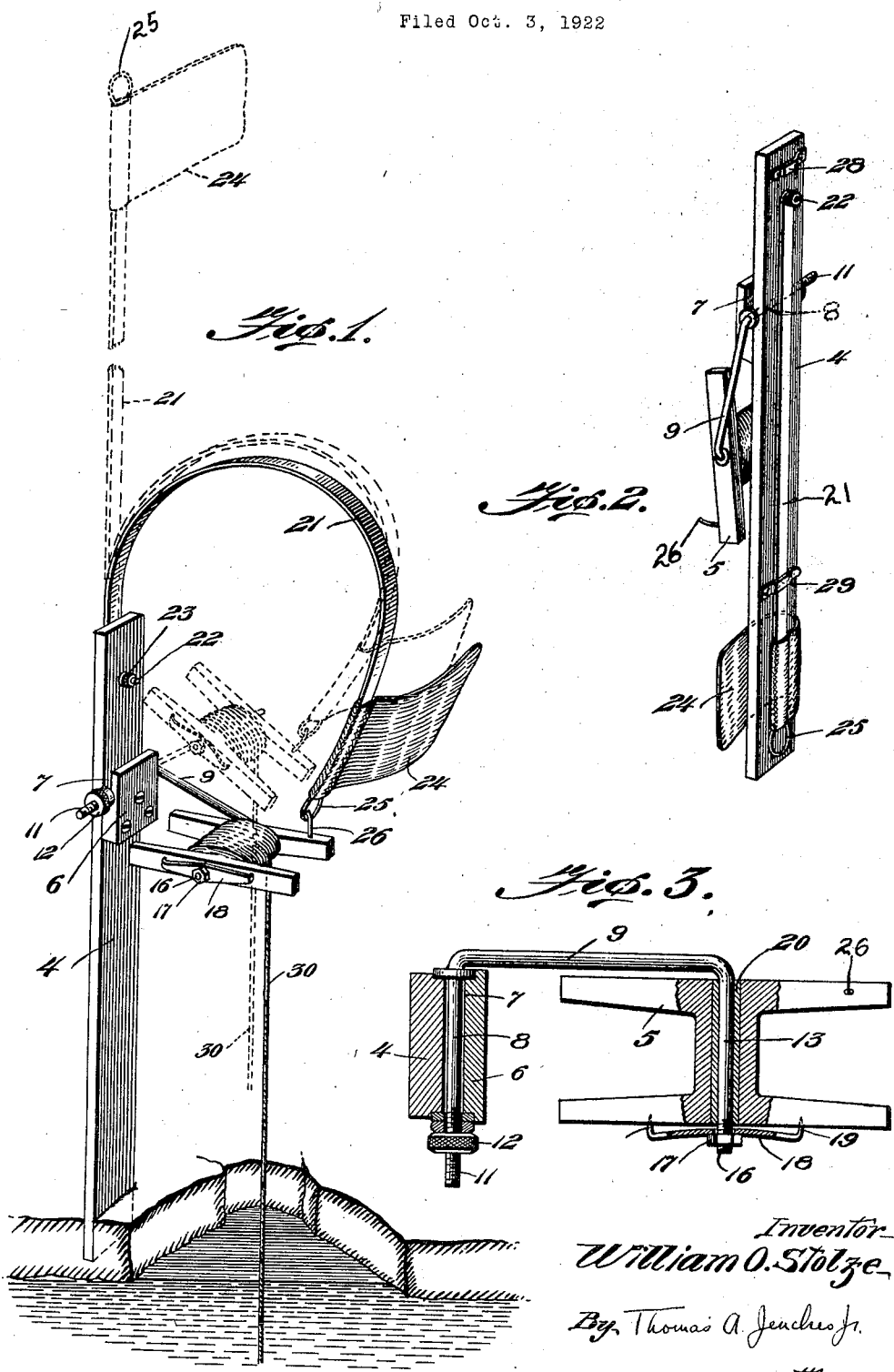
Inventor
William O. Stolze
By Thomas A. Jenckes Jr.
Attorney Patented Apr. 10, 1923.

1,451,124

UNITED STATES PATENT OFFICE.

WILLIAM OTTO STOLZE, OF NEWPORT, RHODE ISLAND.

AUTOMATIC DEVICE FOR FISHING THROUGH ICE.

Application filed October 3, 1922. Serial No. 592,161.

*To all whom it may concern:*

Be it known that I, WILLIAM O. STOLZE, a citizen of the United States, residing at Newport, in the county of Newport and State of Rhode Island, have invented certain new and useful Improvements in Automatic Devices for Fishing Through Ice, of which the following is a specification.

My invention relates to improvements in automatic devices for fishing through the ice, commonly called fish traps.

The automatic mechanism of a device of this sort is subject to extreme conditions of weather. The main object of my invention is to provide a fish trap of simple construction that will remain automatic during the severest conditions of weather.

When the usual hole is cut in the ice, ice quickly begins to form around the edges of the hole. As my reel is pivoted on a rod adjustably attached to the support, my support may be firmly installed in a vertical position, at the same time allowing the line depending from the pivoted reel to strike the water in the center of the hole. A further object of my invention is thus to provide a fish trap which may be supported firmly in a vertical position at the same time permitting the line to be dropped in the water through the center of the hole away from the ice which tends to form on its edges.

It has been found in practice that on former fish traps many of the fish that bite have not been properly hooked, and are lost. The flexible staff should be adjusted so as to trip on the slightest bite, yet not be tripped by a heavy wind. A further object of my invention is thus by means of my pivoted reel to permit fine adjustment for windage, so as to permit the trap to function on the slightest bite possible under the prevailing wind conditions. It is obvious that if this adjustment is employed, the trap will function under a lighter bite in a light wind than it is possible to set it for in the heavy wind, for a heavy wind itself will tend to revolve the reel and release the staff.

The advantages of a reel are obvious. It is the custom where fish traps without reels are used to allow the line to lie on the wet ice to which it tends to freeze. In this manner many fish are lost. By employing a reel the line is kept off the ice, and is wound taut on a member which freely revolves to give the desired length of line. My invention in this particular goes further than this. It is common knowledge to fishermen that when a fish takes the hook he pulls out a certain length of line, and then stops as the fisherman presents further easy resistance to the letting out of more line, and the hook sinks into the fish's mouth. A further object of my invention is to inject this resistive element in an improved form into an automatic fish trap. Where reels have been formerly applied to fish traps without a tensioning device, when the fish stops, the revolving inertia of the reel offers no further resistance, to the letting out of the line, and either the fish is not hooked or the line is let out so as to become much snarled and tangled around the reel. A further object of my invention is thus to provide a simple spring tensioning device which causes the fish to be properly hooked and prevents the backlash.

The common mounting of reels causes the wood of the reel to rub against the metal of the usual supporting spindle. Under the extreme conditions of cold and moisture present ice tends to form on the wood so as to warp the wood, and to prevent its free revolution on the metal spindle. A further object of my invention is to provide a bearing which will at all times even under the most extreme conditions of weather insure free revolution of the reel.

The advantages of a light resilient staff made out of steel or other flexible material are obvious. They are very sensitive, are freely released on slight pressure, and their use dispenses with the necessity of a separate spring. A further object of my invention is to provide the advantage of the combination of a flexible resilient staff with a reel pivoted on a rod adjustably attached to the support, enabling the finest adjustments for the prevailing wind conditions, etc. to be made, either with or without the additional combination of my improved, simplified, tensioning device.

A further object of my invention is to provide a fish trap which may be conveniently folded.

A further object of my invention is to provide a fish trap that is simple, durable, and easy to manufacture.

These and such other features of my invention as may hereinafter appear will be best understood from a description of one embodiment thereof such as is shown in the accompanying drawings.

In the drawings Fig. 1 is a perspective view of my improved fish trap in use.

Fig. 2 is a perspective view of the opposite side of my fish trap showing the device in folded position.

Fig. 3 is a detailed sectional view of the reel and standard illustrating the method of mounting the reel.

In the drawings 4, is the usual standard or support shown mounted in the ice in a vertical position. Any means of mounting a member on the support, on which the reel 5 is pivoted, may be employed. As shown in the drawings the supporting block 6 is attached to the support 4. The upper part of the supporting block 6 is cut away at 7 near the support 4, to receive the base 8 of the reel supporting rod 9. The reel supporting rod 9 is bent at right angles to itself as it emerges from the supporting block, and projects outwardly. The free end of the base 8 is threaded at 11 to receive the nut 12. It is thus apparent that the reel 5, and supporting rod 9 may be entirely removed from the supporting block 6 when the threaded pressure on the nut 12 is released, or that it may be locked in any angular position relative to the support 4. The outer portion 13 of the supporting rod 9 is again bent at right angles to itself and forms a supporting spindle for the reel 5. Its outer end is also threaded at 16 to receive the nut 17. Interposed between the side of the reel 5, and the nut 17 is my improved spring tensioning device 18. This comprises a strip of resilient metal bent at each end to form the prongs 19 which engage the reel 5, said strip having a hole in its center for mounting on the supporting rod 13. Tightening of the nut 17 increases the tension on the spring 18 which increases the resistance to the free revolving of the reel 5 by causing increased friction at the base of the spindle portion 13, and prevents all backlash with consequent tangling. The inner wearing surface of the reel 5 is provided with the metallic bearing 20.

The resilient flexible staff 21 is mounted on the upper end of the support 4 by means of the bolt 22 which extends through a hole in the support 4 and is locked in position by the nut 23. It has attached to its upper end the signal flag 24, and at its upper extremity is provided with the ring 25 adapted to engage the trip finger 26 mounted on one of the outer sides of the reel 5.

The rear surface of the support 4 is provided with the clamp 28 for holding the flexible staff 21 in operative position, and the clamp 29 for holding the flexible staff 21 in folded position as shown in Fig. 2. The line 30 is mounted as usual on the reel 5.

In operation the reel 5 is pivoted by means of the rod 9 to the support 4, which is stuck in the ice in a vertical position, so that the line 30 is dropped in the center of the hole. The flexible staff 21 is bent over so that the trip finger 26 is inserted in the ring 25 on the outer end of the staff 21, the line 30 being wound as usual on the reel 5. As I employ the combination of a pivoted reel supporting rod 9 and flexible staff 21, the trip finger 26 releases the staff 21 on the slightest pull on the line 30 and consequent revolution of the reel 5 around the spindle 13, whereupon the flexible staff 21 with its signal flag 24 swings to the position shown in dotted lines in Fig. 1, and thus signals the fisherman that there has been a bite.

The reel supporting rod 9 is locked at predetermined positions by the nut 12 to the support 4, and retained thereby in said respective positions during use. By varying the setting of the rod 9 in the cutaway portion 7 of the block 4, and thereby the angle that the rod 9 makes with the support 4, the device may be set so as to be operated by the slightest pull on the line 30 possible under the prevailing wind conditions. It is obvious that when the reel supporting rod 9 is in a plane perpendicular to that in which the support 4 is set in the ice the flexible staff 21 is most easily released. When the reel supporting rod 9 is set at an angle of more or less than 90° with the support as shown in dotted lines in Fig. 1, the trip finger 26 will be placed at a greater angle to a plane passing through the base of said finger parallel to the plane, usually vertical, in which the support 4 is mounted, and the flexible staff 21 will be further bent so that it will require a greater pull on the line 30 to release it. Thus it is possible to adjust my device, so as to release the staff 21 at the slightest pressure possible under the prevailing conditions. My spring tensioning device 18 may be adjusted by means of the nut 21 to prevent backlash, and to provide adjustable resistance to the unwinding of the line. As explained above the bearing 20 which may be oiled as desired is at all times freely revolvable on the outer end or spindle 13 of the supporting rod 9.

It is thus apparent that my improved fish trap is automatic and almost human in its actions, and is constructed so as to operate under varying, and extreme conditions of weather.

What I claim as new, and desire to secure by Letters Patent is:

1. A fishing device of the character described comprising in combination, a support, a reel, a reel supporting rod pivotally attached to the support, a flexible signalling staff attached to the support, a ring on the staff adapted when in set position to engage a trip finger on the reel, a flexible tensioning metal strip mounted adjacent the reel on the supporting rod, a nut on the tension end of the rod adapted to vary the tension on the metal strip and to adjustably increase the resistance to the unwinding of the reel, and a metal bearing between the reel and the supporting rod.

2. A fishing device of the character described comprising in combination, a support, a reel, means adjustable at different angles for pivotally mounting the reel on the support, a flexible signalling staff attached to the support, means, releasable on pressure, for engaging the flexible staff with the reel, adjustable tensioning means to offer resistance to the unwinding of the reel, and a metal bearing for the reel.

3. A fishing device of the character described comprising in combination, a support, a reel, a reel supporting rod for pivotally mounting the reel on the support adjustable at different angles thereto, a flexible signalling staff attached to the support, a ring on the staff adapted when in set position to engage a trip finger on the reel, a nut on the end of the supporting rod, a tensioning device between the reel and the nut comprising a flexible metal strip mounted on said rod with prongs on its outer ends to engage the reel, a metal bearing between the metallic supporting rod and the reel, and a fish line carried by the reel.

4. A fishing device of the character described comprising in combination, a support, a reel, means adjustable at different angles for pivotally mounting the reel on the support, a flexible signalling staff attached to the support, means, releasable on pressure, for engaging the flexible staff with the reel, and an adjustable tensioning means to offer resistance to the unwinding of the reel.

5. A fishing device of the character described comprising in combination, a support, a reel, means adjustable at different angles for pivotally mounting the reel on the support, a flexible signalling staff attached to the support, and means, releasable on pressure, for engaging the flexible staff with the reel.

6. A fishing device of the character described comprising in combination, a support, a reel, a reel supporting rod, means adjustable to the support at different angles for pivotally mounting the reel thereon, a flexible signalling staff attached to the support, means, releasable on pressure, for engaging the flexible staff with the reel, an adjustable tensioning means to offer resistance to the unwinding of the reel comprising a flexible metal strip mounted on said rod with prongs on its outer ends adapted to engage the reel and means for varying the tension of said strip against the reel.

In testimony whereof I affix my signature.

WILLIAM OTTO STOLZE.